(12) United States Patent
Kuehn et al.

(10) Patent No.: US 11,440,213 B2
(45) Date of Patent: Sep. 13, 2022

(54) POWER TOOL HAVING AT LEAST ONE MOTOR AXIS AND ONE OUTPUT AXIS

(71) Applicant: Robert Bosch GmbH, Stuttgart (DE)

(72) Inventors: Thorsten Kuehn, Waldenbuch (DE); Florian Esenwein, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 378 days.

(21) Appl. No.: 16/471,452

(22) PCT Filed: Dec. 19, 2017

(86) PCT No.: PCT/EP2017/083451
§ 371 (c)(1),
(2) Date: Jun. 19, 2019

(87) PCT Pub. No.: WO2018/114893
PCT Pub. Date: Jun. 28, 2018

(65) Prior Publication Data
US 2019/0329441 A1 Oct. 31, 2019

(30) Foreign Application Priority Data

Dec. 21, 2016 (DE) ...................... 10 2016 225 719.6

(51) Int. Cl.
*B27C 5/10* (2006.01)
*B23Q 5/04* (2006.01)
(52) U.S. Cl.
CPC ................ *B27C 5/10* (2013.01); *B23Q 5/046* (2013.01)

(58) Field of Classification Search
CPC .......... B27C 5/10; B23Q 5/046; B23B 45/02; B23B 45/008; B23B 39/167; B23B 39/18;
(Continued)

(56) References Cited

U.S. PATENT DOCUMENTS 3,111,969 A * 11/1963 Bivens ...................... B27B 5/08
30/373
3,454,061 A * 7/1969 Okoniewski ........... B27D 5/006
144/134.1
(Continued)

FOREIGN PATENT DOCUMENTS

CN 101304837 A 11/2008
CN 201175783 Y 1/2009
(Continued)

OTHER PUBLICATIONS

International Search Report corresponding to PCT Application No. PCT/EP2017/083451, dated Jan. 22, 2018 (German and English language document) (7pages).

*Primary Examiner* — Matthew Katcoff
(74) *Attorney, Agent, or Firm* — Maginot, Moore & Beck LLP

(57) ABSTRACT

A power tool, in particular a router, includes a motor shaft, at least one output shaft defining an output axis that is coaxial with the output shaft, and at least one electromotive drive acting on the motor shaft. The motor shaft defines a motor axis with the electromotive drive which is coaxial with the motor shaft. The motor axis and the output axis are arranged substantially parallel to and at a distance from one another.

17 Claims, 6 Drawing Sheets

(58) Field of Classification Search
CPC ......... B24B 23/02; B24B 23/04; B24B 47/12; Y10T 408/67
See application file for complete search history.

(56) References Cited

U.S. PATENT DOCUMENTS

| | | | | |
|---|---|---|---|---|
| 3,494,394 | A | | 2/1970 | Stock |
| 3,494,395 | A | * | 2/1970 | Graham ............... B27C 5/10 144/136.95 |
| 3,718,405 | A | * | 2/1973 | Keiter ............... B23Q 5/162 408/128 |
| 4,242,839 | A | * | 1/1981 | Armbruster ........... B24B 23/04 451/357 |
| 4,266,376 | A | * | 5/1981 | Overy ............... B24B 23/02 15/23 |
| 4,461,330 | A | * | 7/1984 | Judkins ............... B27C 5/10 451/239 |
| 4,871,227 | A | * | 10/1989 | Tilse ............... G02B 6/3806 385/55 |
| 4,871,629 | A | * | 10/1989 | Bunyea ............... B25F 5/02 429/97 |
| 5,694,992 | A | * | 12/1997 | Kikuchi ............. B23Q 3/007 144/136.95 |
| 6,558,090 | B2 | * | 5/2003 | Lagaly ............... H01M 50/247 144/136.95 |
| 6,779,952 | B2 | * | 8/2004 | Zhang ............... B23Q 5/162 408/128 |
| 6,846,138 | B1 | | 1/2005 | Phillips et al. |
| 7,448,420 | B2 | * | 11/2008 | Mair ............... B27C 1/005 144/136.95 |
| 7,871,227 | B2 | * | 1/2011 | Adamczak ............ B27C 5/10 409/134 |
| 9,168,592 | B1 | * | 10/2015 | Stavig, Jr. ............ B23B 45/008 |
| 2007/0072522 | A1 | * | 3/2007 | Spitznagel ............ B24B 23/02 451/259 |
| 2012/0241047 | A1 | | 9/2012 | Kato et al. |
| 2014/0271015 | A1 | | 9/2014 | Reinwald et al. |

FOREIGN PATENT DOCUMENTS

| | | |
|---|---|---|
| CN | 102666044 A | 9/2012 |
| CN | 105508530 A | 4/2016 |
| DE | 1 628 945 A1 | 3/1971 |
| DE | 102 15 736 A1 | 7/2003 |
| DE | 10 2005 053 534 A1 | 5/2007 |
| DE | 10 2015 201 575 A1 | 10/2015 |
| DE | 10 2015 201 576 A1 | 3/2016 |
| EP | 2 341 359 A1 | 7/2011 |
| EP | 2 502 720 A1 | 9/2012 |
| GB | 2 287 217 A | 9/1995 |
| JP | 2013-214941 A | 10/2013 |

* cited by examiner

Fig. 7
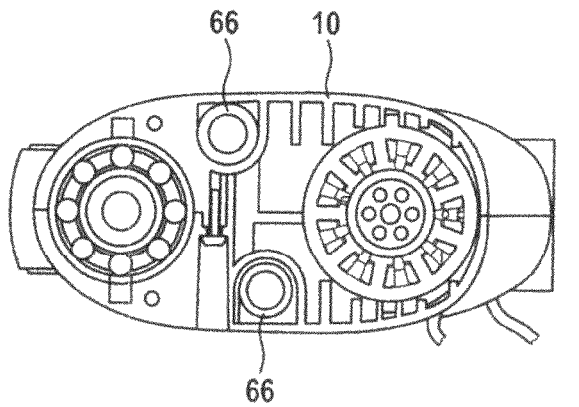
7a)
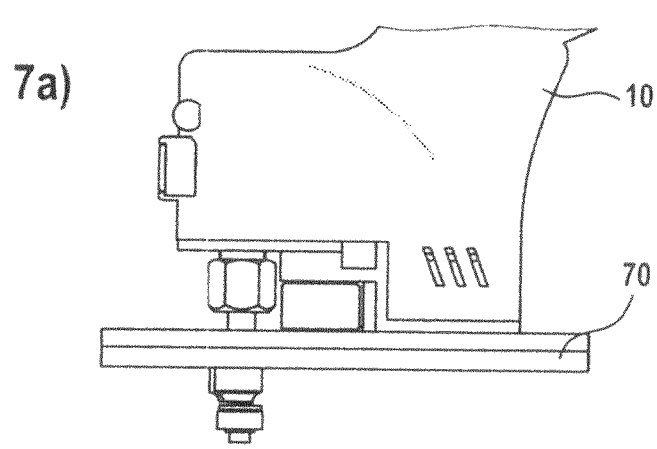
7b)
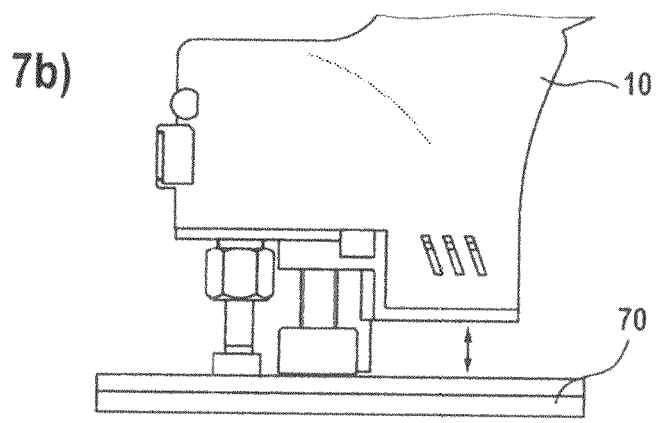

POWER TOOL HAVING AT LEAST ONE MOTOR AXIS AND ONE OUTPUT AXIS

This application is a 35 U.S.C. § 371 National Stage Application of PCT/EP2017/083451, filed on Dec. 19, 2017, which claims the benefit of priority to Serial No. DE 10 2016 225 719.6, filed on Dec. 21, 2016 in Germany, the disclosures of which are incorporated herein by reference in their entirety.

The disclosure relates to a power tool having at least one motor axis and one output axis.

SUMMARY

The power tool according to the disclosure is preferably realized as a router. The power tool according to the disclosure has the advantage of being particularly powerful.

It is proposed that at least one motor axis be defined by an electromotive drive acting upon a motor shaft, which motor axis is coaxial with the motor shaft. At least one output shaft defines an output axis, which is coaxial with the output shaft. Advantageously, the motor axis and the output axis are arranged substantially parallel to and at a distance from each another.

In an embodiment according to the disclosure, the distance between the motor axis and the output axis is preferably between 50 mm and 80 mm, in particular between 60 mm and 70 mm. Preferably, however, the distance between the motor axis and the output axis is 65 mm.

In a further embodiment according to the disclosure, the distance between the motor axis and the output axis is preferably between 15 mm and 60 mm, in particular between 40 mm and 20 mm. Preferably, however, the distance between the motor axis and the output axis is 24 mm.

Advantageously, the transmission of torque from the electromotive drive to the output shaft is effected via a belt drive. A particularly wear-free transmission of torque is thus possible.

Advantageously, the first housing has at least one hand-rest surface. In this case, the hand-rest surface is intersected by the output axis of the output shaft. Particularly ergonomic guiding of the hand-held power tool by an operator is thus possible.

At least one operating element is arranged on and/or in a region close to the hand-rest surface. The operator can thus operate the operating element without difficulty during use of the hand-held power tool, without having to remove the hand from the hand-rest surface.

Two adjusting elements are advantageously arranged on the power tool, wherein the two adjusting elements are arranged in the space produced between the parallel arrangement of the motor shaft and the output shaft. Thus, advantageously, the routing depth can be set to coarse and to fine.

It is proposed that a base plate be arranged on the adjusting elements, the base plate being arranged asymmetrically on the output shaft.

Further advantages and expedient embodiments are disclosed by the description of the figures and the drawings.

BRIEF DESCRIPTION OF THE DRAWINGS

The drawings show embodiments of a power tool according to the disclosure.

There are shown.

DETAILED DESCRIPTION

The same references are used for the components that are the same in the differing exemplary embodiments.

Figure 1:
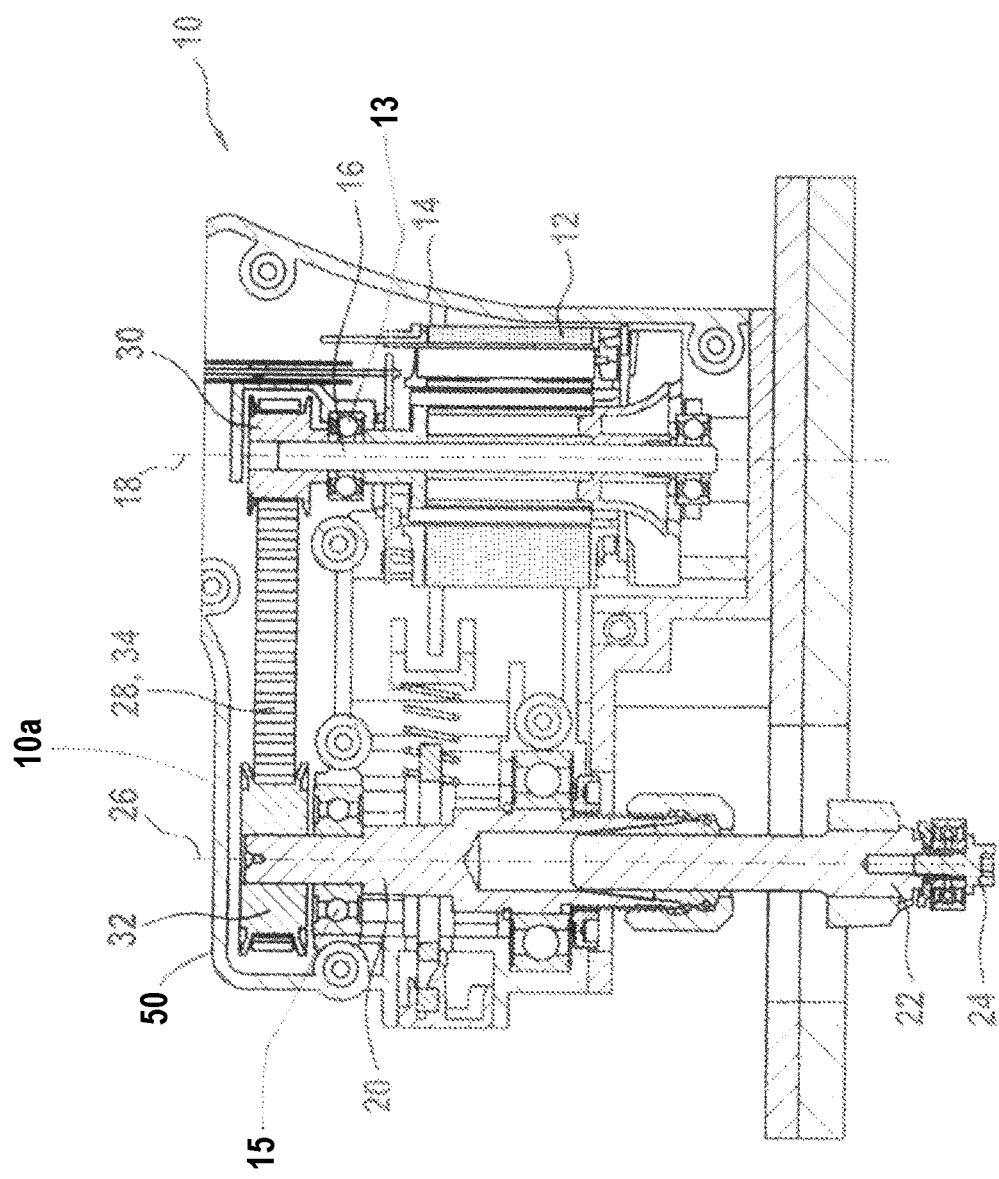
FIG. 1 a power tool according to the disclosure, in a schematic representation, FIG. 2 a second embodiment of the power tool according to the disclosure, in a schematic representation, FIG. 3 a belt drive, FIG. 4 a further embodiment of the power tool according to the disclosure, in a schematic representation, FIG. 4a a further embodiment of the power tool according to the disclosure, in a schematic representation, FIG. 5 a further embodiment of the power tool according to the disclosure, in a schematic representation, FIG. 6 a further embodiment of the power tool according to the disclosure, in a schematic representation, FIG. 7 a further embodiment of the power tool according to the disclosure, in a schematic representation.

FIG. 1 shows a schematically represented router 10 according to the disclosure, having a housing 14 that has an upper part, preferably of plastic, and a lower part, preferably of aluminum, further designs of the housing also being conceivable, for example with a removable cover, or of a barrel-type design. Arranged in the housing 14 is an electromotive drive 12, which causes a tool spindle 22 to rotate. The tool spindle 22 is connected in a rotationally fixed manner to a tool receiver 24, into which a routing tool can be clamped for the purpose of performing work on a workpiece. The electromotive drive 12 is connected to a motor shaft 16. The motor shaft 16, together with the electromotive drive 12, forms a motor axis 18. The motor axis 18 is a theoretical axis, which is coaxial with the motor shaft 16. An output shaft is likewise arranged in the housing 14. The output shaft 20 is continued in a tool spindle 22. It is also conceivable, however, for the output shaft 20 to be connected to the tool spindle 22 via a coupling. It is also conceivable, however, for the output shaft 20 to be connected to the tool spindle 22 via a conventional transmission or a belt drive. The tool spindle 22 carries a tool holder 24. The tool holder 24 is, for example, a collet chuck. A machining tool is inserted in the collet chuck and fixedly clamped by means of a cap nut. The machining tool is, for example, a routing tool. The power tool 10 is suitable for routing and groove-cutting, or for bevel-routing. The output shaft 20 defines an output axis 26, which is coaxial with the output shaft 20. The output axis 26 is a theoretical axis, which is coaxial with the output shaft.

According to the disclosure, the motor axis 18 and the output axis 26 are arranged parallel to an at a distance from one another. The parallel arrangement of the motor axis 18 and the output axis 26 renders possible a greater torque at the routing tool, in that any transmission ratios may be selected. At the same time, the deflection of the motor shaft is reduced.

In the embodiment according to the disclosure, the distance between the motor axis 18 and the output axis 26 is between 50 mm and 80 mm, in particular between 60 mm and 70 mm. Preferably, however, the distance between the motor axis 18 and the output axis 26 is 65 mm. This has the advantage that the router is very compact and ergonomic.

Figure 2:
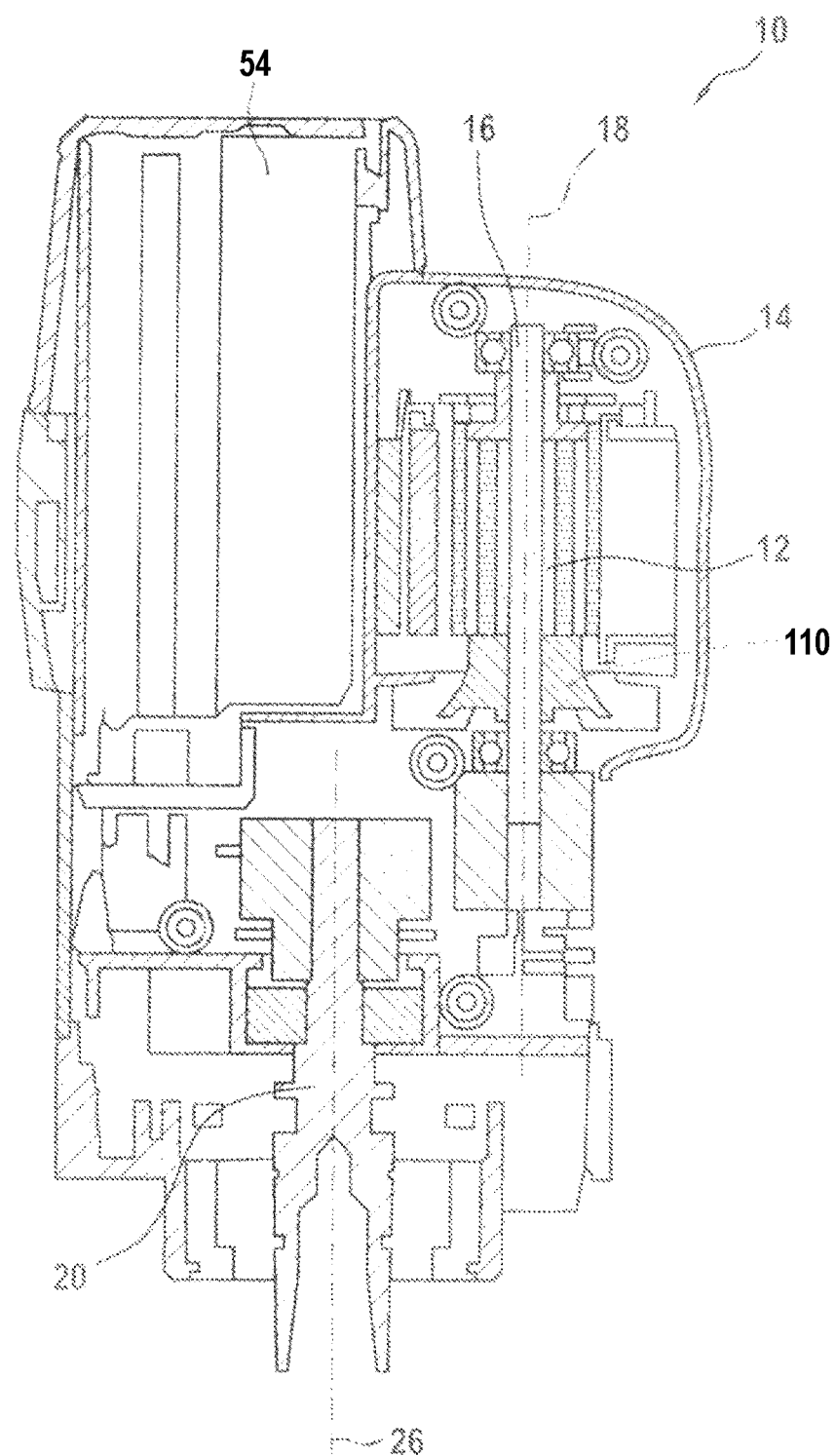

A particularly space-saving embodiment is shown in FIG. 2. The electromotive drive 12 is accommodated in the housing 14. In the exemplary embodiment according to FIG. 2, the electromotive drive 12 is a brushless electronically commutated electric motor. The electromotive drive 12 is connected to a motor shaft 16. The fan impeller 110 is connected to the motor shaft 16. Arranged parallel to the electromotive drive 12 in the housing is a rechargeable battery 54. The rechargeable battery 54 serves to supply energy to the router 10. The rechargeable battery 54 is inserted in the housing 14. The rechargeable battery 54 and the electromotive drive 12 are arranged on a side that faces away from the tool receiver, over the output shaft 20. Consequently, there is a saving of structural space, and the router can be of a compact structure. In this particularly space-saving embodiment, the distance between the motor axis 18 and the output axis 26 is between 15 mm and 60 mm. Preferably, however, the distance between the motor axis 18 and the output axis 26 is 24 mm.

In the first exemplary embodiment, the rechargeable battery, which is not shown in FIG. 1, is arranged parallel to the electromotive drive and parallel to the output axis. The structure in the first exemplary embodiment requires structural space that is saved in the second exemplary embodiment.

As shown in FIG. 1, the housing 14 has a hand-rest surface 50. Preferably, the hand-rest surface 50 is formed onto the upper part 10a of the router 10. The hand-rest surface in this case is arranged over the electromotive drive 12. This has the advantage that the router 10 can be guided with precision, since the electromotive drive 12 is directly connected to the motor shaft 16, and the motor shaft 16 is directly connected to the tool spindle 22. Since the hand-rest surface 50 is located directly over the tool spindle 22, the centre of gravity of an operator's hand is lower than in the case of routers of the prior art. Consequently, less force is required to guide the router, and more precise guiding is possible.

As can be seen from FIG. 1, the electromotive drive 12 is connected to the output shaft 20 via a belt drive 28. The belt drive is arranged on a side that faces away from the tool receiver, over a first bearing 13 and a second bearing 15. When the electromotive drive 12 starts to rotate, it transmits a torque, or a rotational motion, to the motor shaft 16. There is a first belt pulley 30 arranged on the motor shaft 16. The first belt pulley 30 is arranged over the first bearing 13. A second belt pulley 32 sits on the output shaft 20, parallel to the first belt pulley 30. The second belt pulley 32 is arranged over the second bearing 15. A belt 34, which transmits the torque from the motor shaft 16 to the output shaft 20, is tensioned by means of the first belt pulley 30 and the second belt pulley 32. However, the first belt pulley 30 may also be arranged between the first bearing 13 and the electromotive drive 12. The second belt pulley 32 may, however, also be arranged between the second bearing 15 and the tool spindle 22. In the embodiment according to the disclosure, the belt drive 28 has a reduction of from 0.9 to 4.0, particularly of from 1.0 to 2.5, but preferably of 1.7. In particular, however, the reduction ratio of the belt drive 28 is adaptable.

Figure 3:
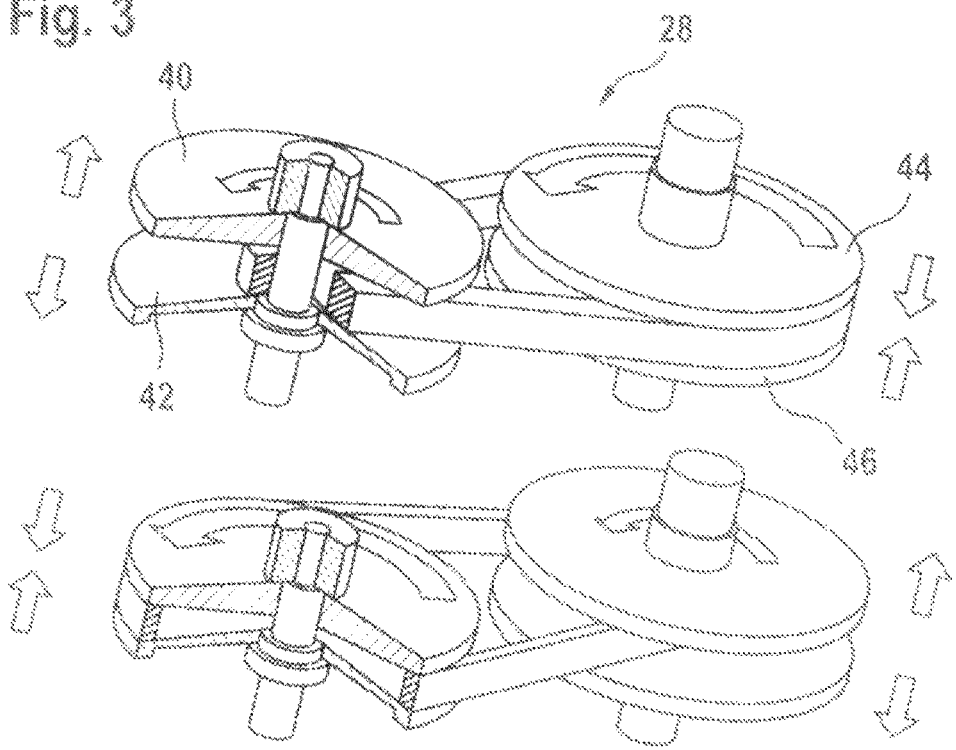

FIG. 3 shows a system in which the reduction ratio of the belt drive 28 can be adapted. For this purpose, an actuator, not represented in greater detail, is attached to the first belt pulley 30. Besides the actuator, a mechanical setting element such as, for example, as setting wheel, may also be attached to the first belt pulley 30. When the actuator moves a push rod, not represented in greater detail, in the direction of a first belt-pulley pair, the first belt pulley 40 of the first belt-pulley pair is forced in the direction of the second belt pulley 42 of the first belt-pulley pair, as a result of which the distance between the first belt pulley 40 of the first belt-pulley pair and the second belt pulley 42 of the first belt-pulley pair is reduced. The belt 34 is thereby forced outward. Since the length of the belt 34 is constant, a second belt-pulley pair adapts. The first belt pulley 44 of the second belt-pulley pair is axially displaceable, against a spring force, with respect to a second belt pulley 46 of the second belt-pulley pair. If the effective diameter on the first belt-pulley pair is increased, the pull on the belt 34 increases, and the two belt pulleys 44, 46 of the second belt-pulley pair are forced apart, against their spring force. The spring force is configured such that the belt 34 does not slip at the torques that can be anticipated. Furthermore, it is conceivable for a mechanical coupling or a further actuator to be provided for adapting the second belt-pulley pair. The belt 34 may be embodied as a toothed belt, as a flat belt, as a V belt, as a band belt, as a cord belt, as a chain or the like. With such a transmission, it is possible for the power tool 10 to be optimally adapted to the respective work conditions, by means of the reduction ratio. The adaptation may be effected automatically, by means of the power tool 10 and a set of electronics in the power tool 10, or a user of the power tool 10 may perform a setting, by means of operating elements on the power tool, or by means of a smartphone, mobile device or similar.

Figure 4:
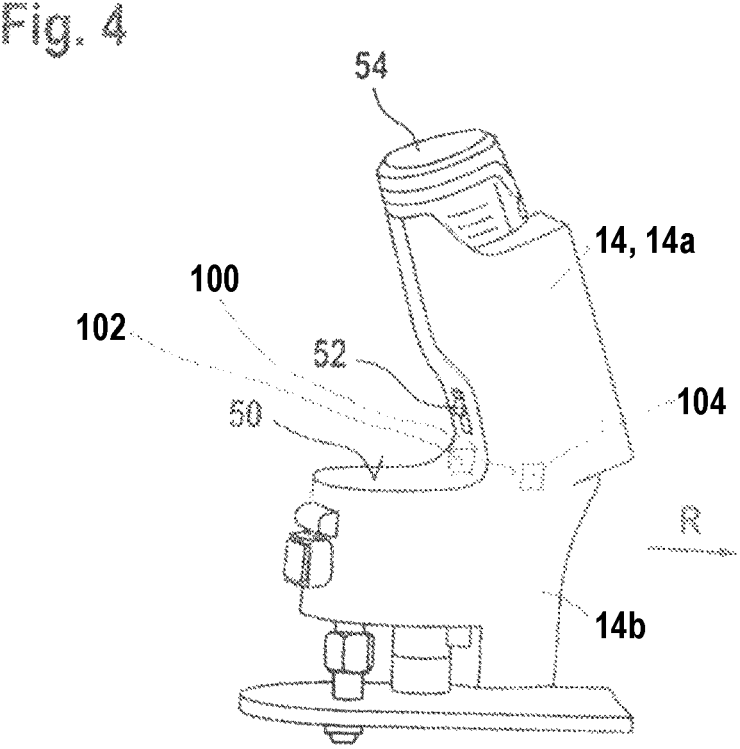

FIG. 4 shows a router 10 having a housing 14. The housing 14 has two portions, a first housing portion 14a and a second housing portion 14b. A rechargeable battery is arranged in the first housing portion 14a. The housing portions 14a and 14b are realized so as to be integral with each other. A transitional region 100 from the first housing portion 14a to the second housing portion 14b is realized such that it serves as a hand-rest surface 50. The hand-rest surface 50 in this case is intersected by the output axis 26 of the output shaft 20. The fingers of a user of the power tool 10 in this case simultaneously encompass a region of the power tool 10 that is located over the output shaft 20, in the first housing 16. To improve handling, this region may have a taper. A hand stop 52 is arranged adjacent to the hand-rest surface 50. The hand of an operator of the power tool 10 is stopped against the hand s top 52, and guides the power tool 10 in a preferred work direction R. Owing to the hand-stop surface in the work direction R, the power tool 10 can be guided predominantly by means of a contact pressure from the arm of a user of the power tool 10, without the need for a strong gripping force.

In order to make the router more ergonomic, and to increase the operating convenience, a first switch 102 is shaped such that, during the work operation and holding of the router 10, it is flush with the housing outer wall. In order to prevent unintentional actuation of the first switch 102, there is a second switch 104 arranged on the housing 14, which must be actuated simultaneously with or shortly before the switch 102. This second switch 102 may also be embodied as an unlocking switch for the first switch 102.

Figure 4A:
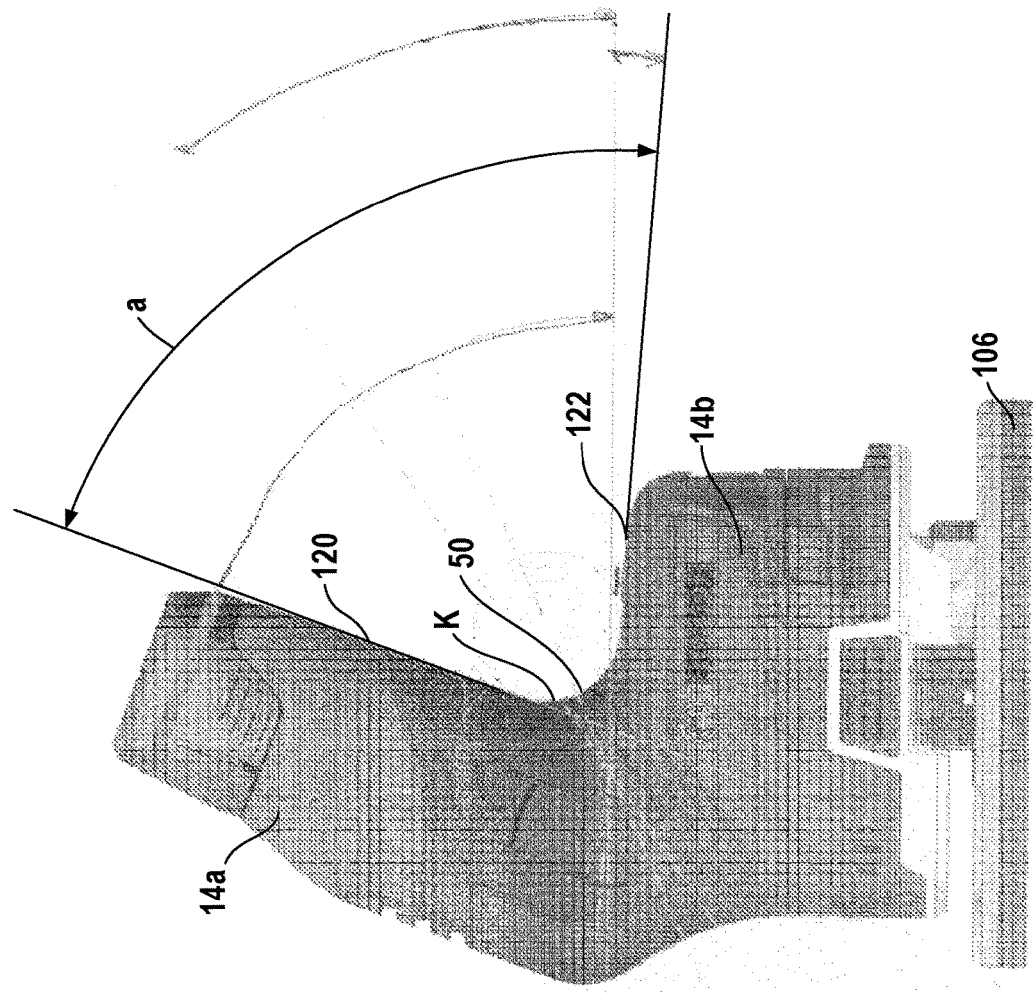

FIG. 4a shows the router 10a from FIG. 3 in a different perspective. The housing 14 has two portions, a first housing portion 14a and a second housing portion 14b. A rechargeable battery 54 is arranged in the first housing portion 14a. The housing portions 14a and 14b are realized so as to be integral with each other. A base plate 106 is arranged on an underside of the second housing portion 104, at a distance from the housing 14. A transitional region 100 from the first housing portion 14a to the second housing portion 14b is realized such that it serves as a hand-rest surface 50. The hand-rest surface 50 is formed from a non-slip material. The hand-rest surface has a curvature K. The curvature K is delimited by a first wall 120 of the first housing portion 14a and by a second wall 122 of the second housing portion 14b. The first wall 120 is substantially parallel to an insertion axis of a rechargeable battery 54. The second wall 122 realizes the hand-rest surface 50. The first wall 120 and the second wall 122 enclose an angle a. In order to obtain a router 10 that can be guided ergonomically, the angle a should be between 70° and maximally 75°. The second wall 122 need not be exactly parallel to the base plate 106 of the router 10. The second wall 122 may be at an angle b of up to −35°.

This results in an ergonomic design in respect of a grip recess affording a pleasant hand grip. At the same time, the centre of gravity of the appliance is shifted into the centre of the power tool 10, and results in a compact design of the power tool 10.

Figure 5:
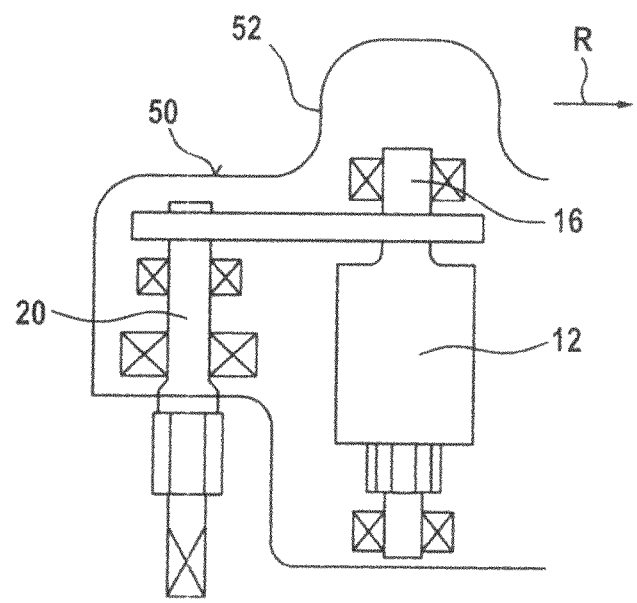

FIG. 5 shows a second embodiment of the power tool 10, as a power tool 10 operated by mains electric power. In the case of a power tool 10 operated by mains electric power, the motor shaft 16 is located higher than the output shaft 20. This region can then serve as a hand stop 52 for the hand in a preferred work direction R.

It is conceivable, both for the preferred embodiment of the battery-operated power tool 10, and for the variant operated by mains electric power, for the hand-rest surface to be positioned above the electromotive drive.

Figure 6:
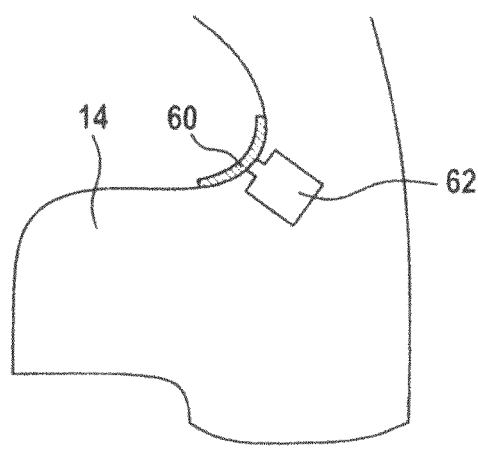

FIG. 6 shows a third embodiment of the power tool 10. The power tool 10 has an operating element 60. The operating element 60 is arranged on and/or in a region close to the hand-rest surface. The operating element 60 is embodied as a push-button cap. Upon actuation of the push-button cap, the power tool 10 is switched on and the electromotive drive is activated.

The operating element 60 is shaped such that, upon being pressed in the work direction R, it is flush with the housing outer wall of the first housing 14.

Since the operating element 60 can be operated unintentionally, and thus could constitute a safety risk, a second switch 62 is designed to be actuated by a user of the power tool 10 simultaneously with or shortly before actuation of the operating element 60. It is also conceivable, however, for the second switch 62 to be embodied as an unlocking switch for the operating element 60.

Alternatively, both the operating element 60 and the safety-relevant second switch 62 may be embodied as contactless switches such as, for example, capacitive switches.

Alternatively, both the operating element 60 and the safety-relevant second switch 62 may be replaced by at least one of the following sensors, the list being non-definitive:

An acceleration sensor, which senses a vibration of the power tool 10 that is caused, for example, by shaking, by one or more predefined motions, or by an impact upon the appliance being placed onto a work surface.

A temperature sensor, preferably a thermal element, which senses the heat at the handle, or the heat of a single finger or of a plurality of fingers at a particular place on the housing surface of the first housing 14 of the power tool 10.

An optical sensor, or a light barrier, which is covered or uncovered by a hand or by one or more fingers, and senses this change of state.

FIG. 7 shows a power tool 10 having an integrated depth setting. For this purpose, two adjusting elements 66 are arranged on the power tool 10, in the space produced between the parallel arrangement of the motor shaft 16 and the output shaft 20. In the exemplary embodiment according to FIG. 6, the adjusting elements 66 are realized as pillars, and mounted so as to be adjustable in height within the housing 14. Mounted on these pillars is a base plate 70, which is arranged asymmetrically on the output shaft 20. FIG. 7a shows a setting in which the maximum routing depth is set, and 7b shows a setting in which the minimum routing depth is set. However, there may also be more than two adjusting elements 66 arranged on the power tool 10.

The invention claimed is:

1. A power tool, comprising:
   a motor shaft;
   at least one output shaft defining an output axis that is coaxial with the at least one output shaft;
   at least one electromotive drive that acts upon the motor shaft, the motor shaft, with the one electromotive drive, defines a motor axis that is coaxial with the motor shaft; and
   a housing including at least one hand-rest surface intersected by the output axis of the at least one output shaft; and
   a spindle driven by the at least one output shaft and extending downwardly out of the housing, the spindle having a tool receiver configured to receive a routing tool,
   an operating element configured to activate the at least one electromotive drive, the operating element being arranged between the motor axis and the output axis,
   wherein the motor axis and the output axis are arranged substantially parallel to each other and at a distance from each other,
   wherein a transmission of torque from the at least one electromotive drive to the at least one output shaft is effected via a belt drive, and
   wherein the power tool is a router.

2. The power tool as claimed in claim 1, wherein the distance between the motor axis and the output axis is between 50 mm and 80 mm.

3. The power tool as claimed in claim 1, wherein the distance between the motor axis and the output axis is between 15 mm and 60 mm.

4. The power tool as claimed in claim 1, wherein the operating element is arranged on and/or in a region adjacent to the at least one hand-rest-surface.

5. The power tool as claimed in claim 1, further comprising:
   a first wall which is substantially parallel to an insertion direction of a rechargeable battery; and
   a second wall which forms the at least one hand-rest surface.

6. The power tool as claimed in claim 5, wherein an angle between the first wall and the second wall is between 70° and 75°.

7. The power tool as claimed in claim 1, wherein the belt drive is arranged along the motor axis at a first upper free end of the motor shaft and at a second upper free end of the at least one output shaft.

8. The power tool as claimed in claim 2, wherein the distance between the motor axis and the output axis is 65 mm.

9. The power tool as claimed in claim 3, wherein the distance between the motor axis and the output axis is between 40 mm and 20 mm.

10. The power tool as claimed in claim 3, wherein the distance between the motor axis and the output axis is 24 mm.

11. The power tool as claimed in claim 1, wherein the belt drive is connected to an end of the output shaft that is opposite the spindle.

12. A power tool, comprising:
    a motor shaft;
    at least one output shaft defining an output axis that is coaxial with the at least one output shaft;

at least one electromotive drive that acts upon the motor shaft, the motor shaft, with the one electromotive drive, defines a motor axis that is coaxial with the motor shaft;

a housing including at least one hand-rest surface intersected by the output axis of the at least one output shaft; and two adjusting elements arranged on the power tool in a space produced between a parallel arrangement of the motor shaft and the at least one output shaft, wherein the motor axis and the output axis are arranged substantially parallel to each other and at a distance from each other, wherein a transmission of torque from the at least one electromotive drive to the at least one output shaft is effected via a belt drive, and wherein the power tool is a router.

13. The power tool as claimed in claim 12, further comprising:

a base plate arranged on the two adjusting elements.

14. The power tool as claimed in claim 13, wherein the base plate is arranged asymmetrically on the at least one output shaft.

15. A power tool comprising:

a motor shaft;

at least one output shaft defining an output axis that is coaxial with the at least one output shaft;

at least one electromotive drive that acts upon the motor shaft, the motor shaft, with the one electromotive drive, defines a motor axis that is coaxial with the motor shaft;

a housing including at least one hand-rest surface intersected by the output axis of the at least one output shaft;

a spindle driven by the at least one output shaft and extending downwardly out of the housing, the spindle having a tool receiver configured to receive a routing tool; and a rechargeable battery arranged above the spindle, wherein the motor axis and the output axis are arranged substantially parallel to each other and at a distance from each other, wherein a transmission of torque from the at least one electromotive drive to the at least one output shaft is effected via a belt drive, and wherein the power tool is a router.

16. The power tool as claimed in claim 15, further comprising an operating element configured to activate the at least one electromotive drive, the operating element being arranged between the motor axis and the output axis.

17. The power tool as claimed in claim 15, wherein the rechargeable battery is arranged parallel to the motor axis and to the output axis.

* * * * *